June 2, 1931.  J. G. RUNNING  1,808,611
MITER BOX
Filed May 24, 1930  4 Sheets-Sheet 1
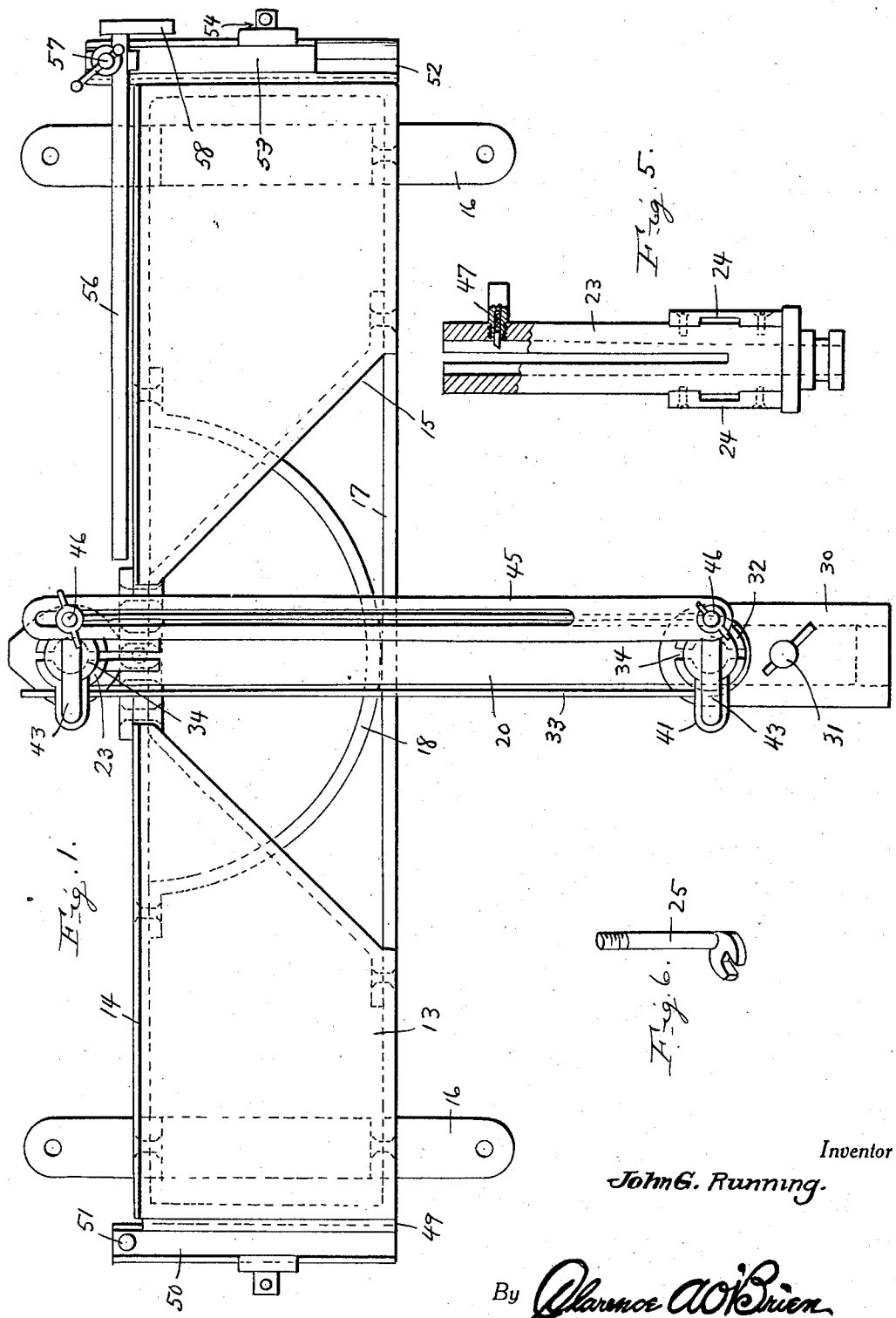
Inventor
John G. Running.
By Clarence A. O'Brien
Attorney

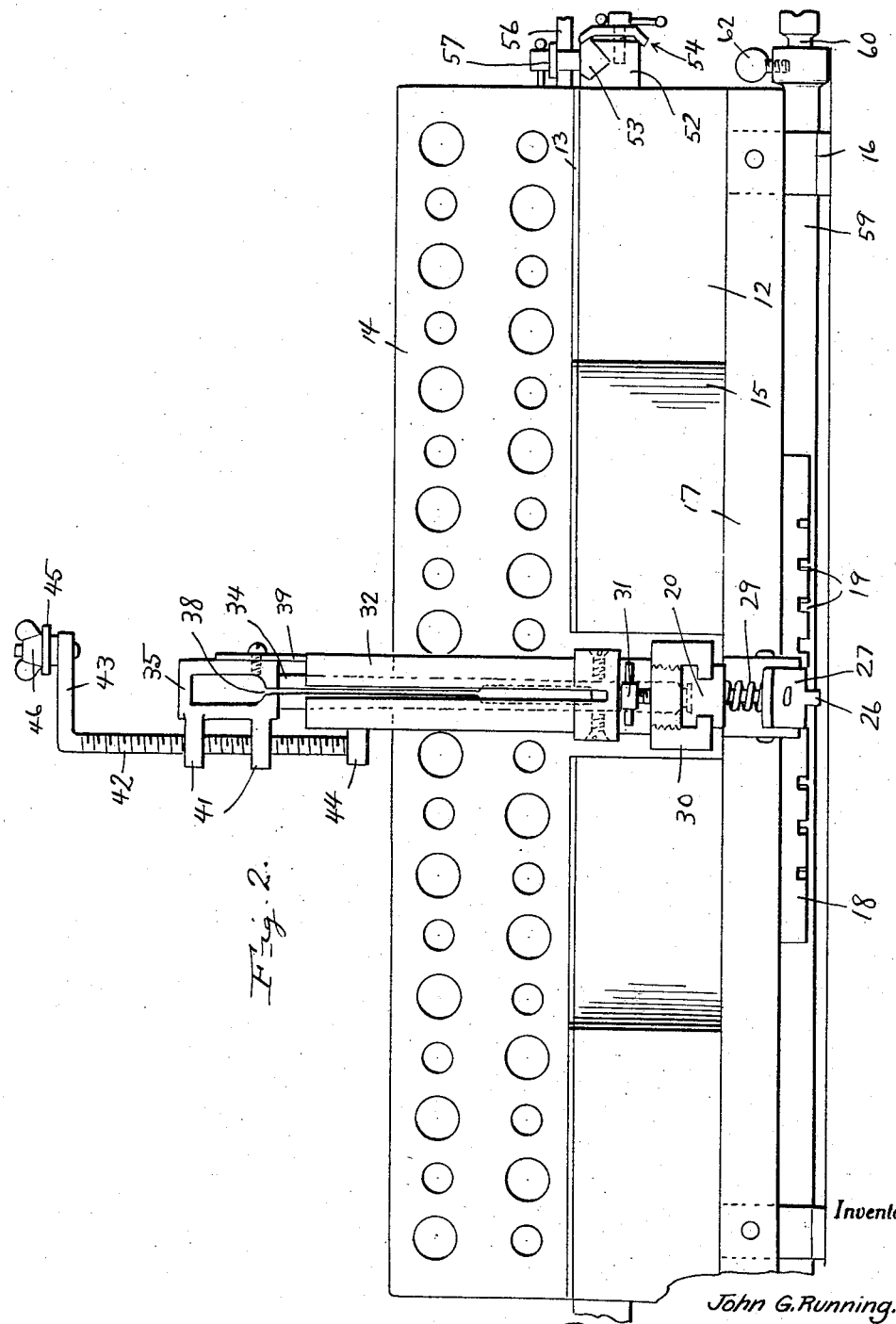

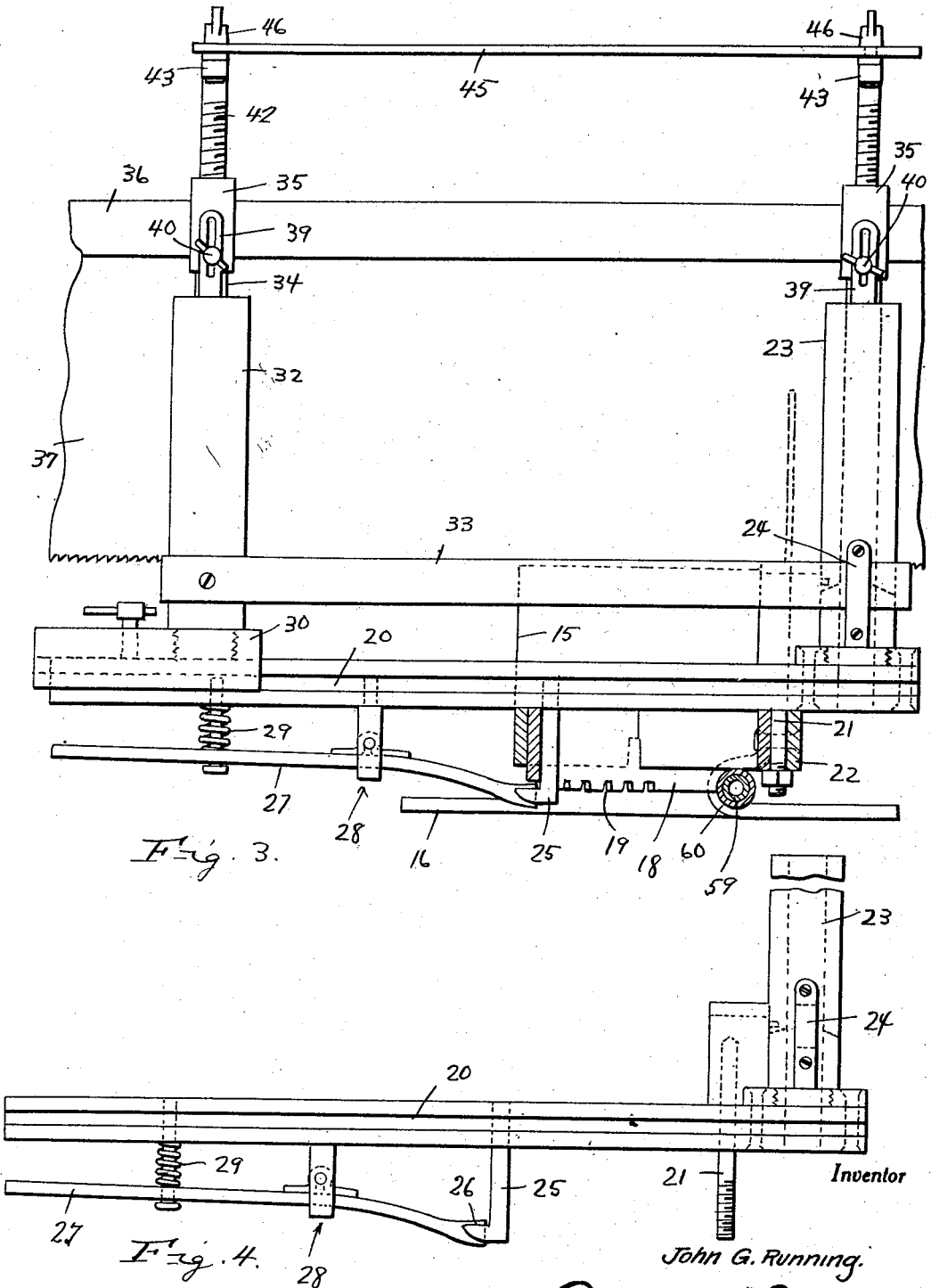

June 2, 1931. J. G. RUNNING 1,808,611
MITER BOX
Filed May 24, 1930 4 Sheets-Sheet 4
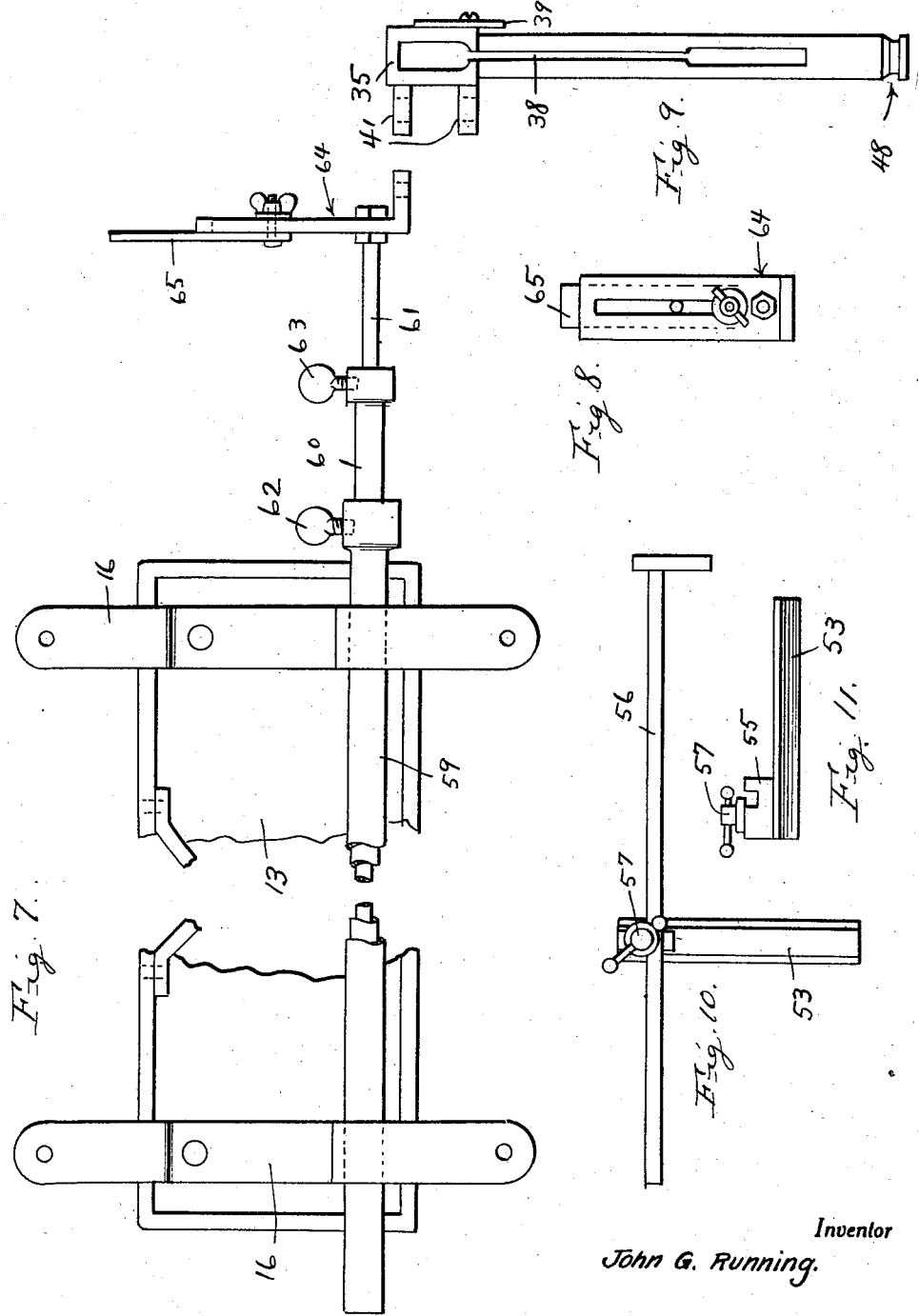
Inventor
John G. Running.
By Clarence A. O'Brien
Attorney Patented June 2, 1931

1,808,611

UNITED STATES PATENT OFFICE

JOHN GERHARD RUNNING, OF MIAMI, FLORIDA

MITER BOX

Application filed May 24, 1930. Serial No. 455,360.

This invention relates to an improved miter box constructed to expedite accurate handling and sawing of work, especially small stock, such as molding and the like.

The invention has more particular reference to the form of miter box which embodies a horizontally swingable carrier and guide for the saw which permits the saw to be adjusted through a limited arc in a horizontal plane to permit reciprocation of the saw for severing the work at the desired angle.

Briefly stated, the improved structure is characterized by a relatively fixed base having an upstanding flange along one longitudinal edge, said flange functioning as a backing plate and straight edge against which the work is placed. Mounted for horizontal swinging in a limited arc on this base is a saw carrier provided with a latch co-operable with a relatively stationary retaining rack on the base. In addition, I provide supplementary appliances and appurtenances, all of which are mechanically co-related to better fulfill the objects and requirements of a structure of this class.

One distinctive feature is the particular construction of the base plate which has its central portion notched out to expose the arcuate rack, and a complemental bar member, which features co-operate in forming a dependable rest and supporting means for the pivotally mounted swingable saw carrier.

Additional novelty is predicated upon the particular construction of the saw carrier and guide device which includes, among other parts, a horizontally swingable guide rail at one end of which is a stationary post structure, and at the opposite end of which is a relatively movable post structure adjustable toward and from the first named post structure and co-operable with the rail through the medium of a sliding shoe.

The advantage of this arrangement is that the posts, in addition to serving as guides for the reciprocatory saw, constitute means for clamping the work between the movable post and the upstanding backing plate of the base structure.

An added distinction is predicated upon the employment of two-part posts, the lower part being fixed and the upper part being in the nature of a sliding standard, whereby to permit the respective upper part to be adjusted vertically to raise and lower the saw to the desired elevation.

A further advantage is founded upon the floating mounting of the adjustable or extensible part of the post structure, together with latching means for maintaining the adjustable part in an elevated state, whereby to hold the saw up in an out-of-the-way position to facilitate the initial placement of the work on the base.

Many other advantageous details and features will become more readily apparent from the following description and drawings.

In the drawings:

Figure 1 is a top plan view of the complete assembly.

Figure 2 is a front elevational view of the same with portions omitted.

Figure 3 is a central transverse vertical sectional view showing the parts on a slightly enlarged scale.

Figure 4 is a detail elevational view of the swingable track rail.

Figure 5 is a view in section and elevation of the rear lower section of the corresponding post.

Figure 6 is a detail view of a keeper for the major retaining latch.

Figure 7 is a bottom plan view of a fragmentary elevational and sectional nature to show the extensible gauge device.

Figure 8 is an end view of the extensible abutment on said gauge device observing it in a direction from right to left in Figure 7.

Figure 9 is an elevational view of one of the vertically extensible standards of the post construction.

Figure 10 is a top plan view of the movable part of an adjustable work stop.

Figure 11 is an end or edge elevation of Figure 10 with the rod member removed.

Attention is first invited to Figure 2, wherein the base construction is shown. This embodies an elongated body 12 having a right angular metal plate fastened to the top thereof and a horizontal flange 13 of the plate constitutes the main facing and work rest. The apertured upstanding flange 14 constitutes the straight edge or backing plate for the work. The apertures are to reduce the weight.

The flange 13 as well as the body 12 is centrally notched as at 15 to provide a clearance pocket. The numerals 16 designate transverse rests fastened in any suitable manner to the base. The numeral 17 designates a front longitudinal bar forming a part of the supporting means for the saw carrier hereinafter described. The numeral 18 designates an arcuate segment formed with teeth 19 thereby providing a retaining rack. The crown portion of the rack is fastened to the adjacent portion of the bar 17.

One unit of the saw carrier and guide means is represented in Figure 4 and it will be observed here that it comprises a grooved horizontal bar member 20 which functions as a guide rail. This is formed at the rear end with a depending spindle bolt or pivot 21 mounted in a suitable vertical bearing 22 as seen in Figure 3.

At the pivoted end is an upstanding tube 23 constituting the lower section of the rear post. This is provided with diametrically opposite keeper brackets 24. Depending from the central portion of the rail 20 is a foot 25 whose bifurcated lower end provides a keeper for reception of the retaining end 26 of the latch 27. The latch is pivotally mounted on a hanger 28.

The coil spring 29 is mounted to co-operate with the latch in engaging the latch end 26 with the teeth 19 on the rack 18, as is obvious. This serves to hold the rail in various adjusted positions through a limited arc.

The next part of the carrier comprises a flanged sliding shoe 30 which is mounted for longitudinal shifting on the rail 20. It is provided with a retaining screw 31 to hold it in different adjusted positions. On this shoe is the upstanding tube 32 of the front post structure. Incidentally, there is a U-shaped strap 33 fastened to the tube 32 and having its free end portion slidable through the guide bracket 24. This rail and shoe arrangement allows the tubes 23 to be adjusted toward and from each other. In other words, by sliding the shoe 30 on the rail 20, the tube 32 may be moved toward the relatively stationary tube 23. Moreover, this tube 32 provides a means for clamping the work (not shown) against the backing plate or flange 14. This obviates the necessity of holding the work.

Thus, the carrier also functions as a holder for the work. The extensible section of the posts are represented by the same numerals. Each section comprises a stem or standard 34 telescopically and slidably mounted in the respective tubes 23 or 32 as the case may be. The upper end of each standard is a loop-like head 35 which accommodate the back 36 of the saw. The blade 37 operates in the kerf 38. In addition, the parts 23 and 32 are formed with slots registering with the respective kerfs to permit the desired reciprocation of the saw with respect to the rear and front post structures.

On each of the parts 34 is an adjustable stop 39 and a retaining screw 40 therefor. Moreover, on each head 35 is a pair of outstanding screw-threaded lugs 41 which serve to accommodate the screw-threaded stem portion 42 of the adjusting cranks. The upper end of the crank in each instance is represented by the numeral 43.

The lower end of the screw-threaded stem is engageable with an abutment or stop 44 and by adjusting the stop screw as well as the stop plate 39, the depth of cut of the saw may be accurately regulated. The numeral 45 designates a tie link between the respective adjusting cranks and this link is fastened in place by the thumb nut 46 as is obvious.

The link is slotted so as to permit the front post to be adjusted toward and from the rear post as is obvious. The carrier and guide means may be generally known as the saw mount, and it is in the nature of a multiple part unit which is bodily adjustable to permit the saw to be swung in a horizontal plane through a limited arc. This unit embodies means, as is obvious, for limiting the depth of cut of the saw, and allows unitary adjustment of the standard to the respective posts in a vertical direction.

Moreover, in this arrangement, as is evident, the front post structure is movable toward and from the rear post structure so as to allow the front post structure to cooperate with the backing plate of the base in providing clamping means for holding the work rigidly in place. The latch and rack means of this unit permit the same to be adjusted to and positively held in any desired set position.

Another feature of this arrangement, however, is embodied in the provision of spring-pressed retaining devices 47 (see Figure 5) provided on each of the tubes to permit the standard to be raised to and held in a clearance position. In this connection it will be observed in Figure 9 that the lower end of each standard is formed with an annular groove or head 48 which is arranged so as to permit the latches 47 to snap thereinto as the two standards are raised up into elevated position. Thus by catching hold of the saw and lifting it up, the parts carried by the standard will move up as a unit and the latches or retainers 47 will snap in the grooves 48 to hold the saw in an elevated position. This permits the work to be adjusted, removed, or placed in position as is evident.

Referring again to Figure 1, it will be seen that on one end of the base structure is a transverse guide channel 49 in which a sliding block 50 is arranged. This block is formed with an upright 51 which functions either as a gage element or stop means for one end of the work. In fact, it may be utilized to brace the adjacent portion of the work.

On the opposite end of the base structure is a similar arrangement which as seen in Figures 1 and 2 comprises a relatively rigid guide and retaining channel 52 in which a key 53 is slidable. The key is held in adjusted position through the medium of the fastener 54. On one end of this key, as seen better in Figures 10 and 11, is an elevated enlargement 55 constructed to accommodate a sliding rod 56 provided with a fastener 57 for holding this rod in different adjusted positions.

On the outer end of the rod is a work engaging abutment 58. A further appurtenance embodied in the invention is the extensible gage construction better shown in Figure 7. This comprises a rigidly mounted outer tube 59, a central tube 60, and an extensible rod 61. The tubes 59 and 60 are provided with set screws 62 and 63 for holding these parts in set position. A substantially L-shaped bracket 64 carried by the rod includes an extension 65.

In analyzing the structure, I place particular emphasis upon the saw carrier and guide unit which permits expeditious operation and reciprocation of the saw and which allows the saw to be maintained in out-of-the-way position when desired or permits it to be raised or lowered to the adjusted thickness or height of the work.

Moreover, I call particular attention to the clearance notch formed in the base plate which allows the front post to be adjusted toward and from the backing plate so as to enable extremely small work to be clamped between the front post and the backing plate. Moreover, I place stress on the double crank devices constituting set screws for adjusting the depth of the cut, together with the tie link therebetween for insuring uniform adjustment.

The gage device just recently described is important and so are the adjustable work abutments at opposite ends of the base. In a sense the devices at opposite ends of the base are somewhat of generic or common construction in that each includes a transversely disposed part formed with a keyway and a block like element slidable therein and functioning as a key, together with an abutment associated with and preferably mounted on the key.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. In a structure of the class described, in combination, a relatively fixed base including a work backing element, a swingably mounted saw carrier on said base, retaining means for the carrier, said carrier including a relatively stationary post and a relatively movable post adjustable toward and from the stationary post, whereby to permit the work to be clamped between the movable post and the backing plate, said base plate having a central clearance notch into which the movable post is movable to permit said movable post to approach the backing plate within a fraction of an inch.

2. In a structure of the class described, in combination, a work supporting base, a horizontal rail pivotally mounted on said base and swingable in a limited arc, a rigid upstanding tube on the pivoted end of each rail, a longitudinally slidable shoe on the rail movable toward and from the base, an upstanding tube carried by said shoe, retaining means for holding said shoe in different adjusted positions on the rail, vertically extensible standards mounted for adjustment in said tube, retaining means between the tubes and standards for holding the standards in a stationary elevated position said standards and tubes adapted to slidably carry a saw movable in conjunction with the rail and shoe assembly, a rack on said base, a spring pressed latch carried by said rail and co-operable with said rack, together with stops carried by said tubes, and adjusting screws mounted on said tubes and co-operable with said stops for limiting the depth of cut of the saw said adjusting screws having cranks on their upper ends, and a connecting rod between said cranks for simultaneously and equally adjusting the screws.

In testimony whereof I affix my signature.

JOHN GERHARD RUNNING.